United States Patent Office 3,238,247
Patented Mar. 1, 1966

3,238,247
PREPARATION OF UNSATURATED ACETATES BY THE OXIDATION OF OLEFINS WITH A PALLADIUM SALT IN THE PRESENCE OF EXCESS CUPRIC ACETATE IN HALIDE FREE MEDIUM
James E. McKeon and Paul S. Starcher, Charleston, W. Va., assignors to Union Carbide Corporation, a corporation of New York
Filed May 15, 1963, Ser. No. 280,534
6 Claims. (Cl. 260—497)

This invention relates to the preparation of olefinic esters. In one aspect, the invention relates to a process for the preparation of olefinic esters of acetic acid. In another aspect, the invention relates to a catalytic process for the production of olefinic esters of acetic acid whereby the initial reaction, i.e., alkenylation reaction, and/or the subsequent catalyst regeneration reaction is effected in the presence of oxygen thus extending the activity of the catalyst for extremely long periods of time. In a further aspect, the invention relates to carrying out the aforesaid catalytic process in an essentially halide free system. In further aspects, the invention relates to novel compositions.

In our copending application Serial No. 182,688 entitled "Preparation of Olefinic Esters," filed March 26, 1962, and assigned to the same assignee as the instant application, there is described a homogeneous liquid phase process which involves contacting an olefinic compound with a monocarboxylic acid, in the presence of a catalyst, e.g., Pd(II), a catalytic co-oxidant which functions to maintain said catalyst in its catalytically active state of oxidation, an amount of monocarboxylic acid anion which exceeds the monocarboxylic acid anion concentration solely due to the monocarboxylic acid in the reaction medium, and sufficient oxygen which functions to regenerate the catalytic co-oxidant from a lower state of oxidation, e.g., cuprous acetate, to a higher state of oxidation, e.g., cupric acetate, thereby resulting in the production of the olefinic ester of the monocarboxylic acid, that is $$R'-O-\overset{O}{\underset{\|}{C}}-R$$

wherein R' is a monovalent olefinic radical. The overall reaction is termed an "alkenylation reaction." Thus, if ethylene ($H_2C=CH_2$) is the olefinic compound and acetic acid is the monocarboxylic acid, the resulting product is vinyl acetate $$(H_2C=CH-O\overset{O}{\underset{\|}{C}}CH_3)$$

whereas propylene ($CH_3CH=CH_2$) as the olefinic compound would yield isopropenyl acetate $$(H_2C=\underset{\underset{CH_3}{|}}{C}-O\overset{O}{\underset{\|}{C}}CH_3)$$

as a product.

It has now been discovered quite unexpectedly and surprisingly, indeed, that the productivity of the aforesaid homogeneous liquid phase process can be maintained at extraordinary levels as will be explained hereinafter. By the term "productivity" is meant the yield of product per pass, per unit weight of catalyst solution or unit of reactor volume. By the practice of our novel improved process this productivity factor can be as high as 400 percent, and more, of the maximum productivity obtained in prior homogeneous liquid phase processes. Moreover, our novel improved homogeneous liquid phase process offers practical and economic advantages over a process which employs a slurry of catalyst and/or catalytic co-oxidant in the reaction medium. Among these advantages can be listed, e.g., diminished pumping requirements, avoidance of corrosion and blockage of valves, etc., which necessitate frequent periods of shut down, decreased equipment costs, etc. Also, the productivity of our novel homogeneous liquid phase process is greater than a process which utilizes the slurry route, the amount of catalytic co-oxidant (cupric acetate) being constant in both processes. Furthermore, not only is the novel process effected in a homogeneous liquid phase medium at the commencement of the alkenylation reaction (when Cu(II) is the predominant species), but also, the reaction medium remains homogeneous when the catalytic co-oxidant becomes nearly exhausted (when Cu(I) is the predominant species). Thus, throughout the reaction cycle, the catalytic homogeneous liquid phase is maintained and the precipitation of ordinarily sparingly soluble cuprous compounds, Cu(I), is avoided. The novel process, also, is conducted in the essential absence of the commonly encountered disproportionation of Cu(I) to Cu(II) and copper metal, Cu(O).

Broadly, the novel process involves contacting (1) a homogeneous liquid phase mixture containing acetic acid; Pd(II) as the catalyst; cupric acetate as the catalytic co-oxidant which functions to maintain said catalyst in its catalytically active state of oxidation; and a metal acetate representing lithium acetate, potassium acetate, or mixtures thereof; (2) with an olefinic compound; (3) the concentration of cupric acetate as defined by Expression I I 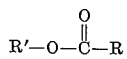

$$\frac{[Cu(OAc)_2]}{[Cu(OAc)_2]+[MOAc]+[Z]}$$

being at least about 10 percent greater than the maximum concentration of cupric acetate definable from Expression II II 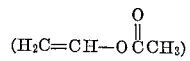

$$\frac{[Cu(OAc)_2]}{[Cu(OAc)_2]+[Z]}$$

wherein Expressions I and II supra represent homogeneous liquid systems at the same temperature, wherein $Cu(OAc)_2$ represents cupric acetate, wherein MOAc represents lithium acetate, potassium acetate, or mixtures thereof, and wherein Z represents acetic acid or a mixture of acetic acid and an inert, normally-liquid organic vehicle; and (4) for a period of time sufficient to produce the olefinic ester of acetic acid as the product. In a highly preferred aspect, the novel process is conducted in the presence of oxygen which is sufficient to regenerate the catalytic co-oxidant from a lower state of oxidation, i.e., cuprous acetate, to a high state of oxidation, i.e., cupric acetate. The commercial and economic attractiveness of this preferred mode is obvious.

It is readily apparent that a major feature of our novel homogeneous liquid phase process resides in the maintenance of a concentration of cupric acetate therein which is at least about 10 percent, and preferably at least about 25 percent, greater than the maximum concentration of cupric acetate in glacial acetic acid per se (measured under the same temperature in both instances). Should an inert, normally-liquid organic vehicle be employed in the novel process, then the comparison is made not with glacial acetic acid per se but with the same mixture of glacial acetic acid and inert vehicle. Expressed in another manner, the novel process employs a concentration of cupric acetate which satisfies Expression III below:

III 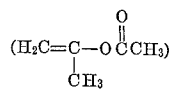

$$\frac{[Cu(OAc)_2]}{[Cu(OAc)_2]+[MOAc]+[Z]} > \frac{[Cu(OAc)_2]}{[Cu(OAc)_2]+[Z]}$$

(hereinafter designated as X)    (hereinafter designated as Y)

wherein X and Y have the meanings disclosed in Expressions I and II previously, and wherein $X$ equals $(1.1-15)Y$, and more preferably still $X$ equals $(2-6)Y$.

A second major feature of our novel process is that the greatly enhanced solubility of cupric acetate in the homogeneous liquid reaction medium is achieved by employing lithium acetate, potassium acetate, or mixtures thereof. It was observed that the use of other Group I metal acetates or Group II metal acetates such as sodium acetate, calcium acetate, zinc acetate, and the like, did not result in the unexpected and pronounced advantages discussed previously. In fact, it should be noted that the use of, for example, sodium acetate, actually lowered the solubility of cupric acetate in the reaction medium. The use of mixtures of potassium acetate and lithium acetate is especially preferred because said mixures readily supercool. This supercooling characteristic is an advantage worth noting since crystallization of same within the system during a temporary upset, e.g., undue temperature lowering, oftentimes is avoided. Moreover, the crystallization of a mixture of lithium acetate and potassium acetate results in fine crystals, and in this respect, the partially crystalline mixture is a manageable fluid or pumpable slush.

Figure 1:
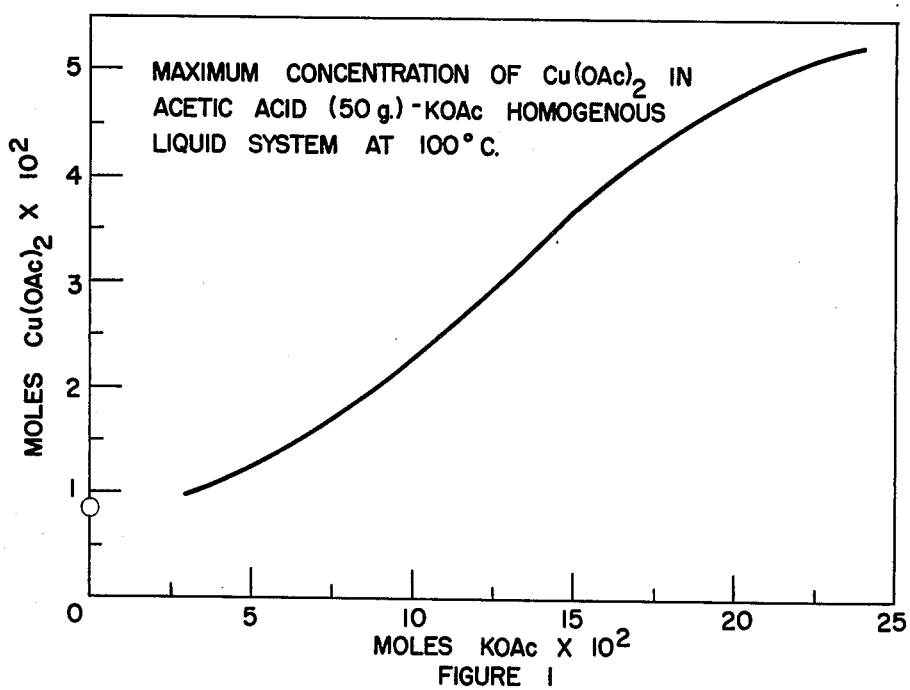
FIGURE 1 represents a solubility curve which discloses the maximum concentration of cupric acetate in acetic acid-potassium acetate homogeneous liquid systems at 100° C.

In a preferred aspect, the novel process is effected in a homogeneous liquid reaction medium in which the amounts of (a) cupric acetate, i.e., $Cu(OAc)_2$, (b) metal acetate (MOAc), i.e., lithium acetate, potassium acetate, or mixtures thereof, and (c) glacial acetic acid with or without an inert, normally-liquid organic vehicle, i.e., Z, are such so as to provide a ratio of from about 1 to about 10 mols of MOAc and up to about 90 mols (e.g., from about 1 to about 90 mols) of Z, per mol of $Cu(OAc)_2$. Several advantages accrue when conducting the novel process in accordance with this preferred aspect. Firstly, the cupric acetate concentration in the liquid reaction medium is exceedingly high and much greater than the concentration of cupric acetate as defined in Expression II supra (this comparison, of course, being made under identical conditions, e.g., same temperature). Secondly, the liquid reaction medium of this aspect possesses a relatively low crystallization temperature, which characteristic affords obvious advantages in the art. Thirdly, the liquid reaction medium possesses a relatively low viscosity. Fourthly, the novel process is made economically and commercially practical and attractive since the productivity can be maintained at high values. These advantages are pronounced when the novel process is conducted in a liquid reaction medium which contains a ratio of from about 2 to about 8 mols of MOAc and from about 10 to about 20 mols of Z, per mol of $Cu(OAc)_2$.

Illustrative inert, normally-liquid organic vehicles which can be employed, if desired, in the novel process include the hydrocarbon nitriles, e.g. acetonitrile, propionitrile, and the like; the N,N-dialkylcarboxamides, e.g., N,N - dimethylformamide, N,N - dimethylacetamide, and the like.

The olefinic compounds which are contemplated as reagents in the novel process are free from acetylenic unsaturation and contain at least one free hydrogen atom bonded to each ethylenic carbon atom of at least one ethylenic group therein, i.e., $>C=C<$. Olefinic compounds which are desirable in the novel process can be characterized by the formula, $RCH=CHR$, wherein each R, individually, can be hydrogen or a monovalent hydrocrabon radical free from acetylenic unsaturation, e.g., alkyl, cycloalkyl, alkenyl, cycloalkenyl, aryl, aralkyl, alkaryl, and the like. In addition, both R variables together with the ethylenic carbon atoms of the preceding formula, can represent a cycloaliphatic hydrocarbon nucleus which contains from 5 to 12 carbon atoms in said nucleus, preferably from 5 to 8 carbon atoms, e.g., a nucleus derived from cyclopentene, cyclohexene, cycloheptene, cyclooctene, cyclododecene, and the like.

Illustrative R variables include, for example, hydrogen, methyl, ethyl, n-propyl, isopropyl, n-butyl, isobutyl, sec-butyl, the pentyls, the hexyls, the heptyls, the octyls, the dodecyls, the octadecyls, vinyl, allyl, 1-propenyl, 1-butenyl, 2-butenyl, 3-butenyl, the hexenyls, the octenyls, cyclopentyl, cyclohexyl, cycloheptyl, cyclohexenyl, phenyl, tolyl, xylyl, ethylphenyl, propylphenyl, benzyl, phenethyl, phenylpropyl, phenylbutyl, and the like.

Exemplary olefinc compounds include, by way of illustrations, ethylene, propylene, 1-butene, 2-butene, 1-pentene, 2-pentene, 1-hexene, 2-hexene, 3-hexene, 1-heptene, 2-heptane, 3-heptene, the octenes, the decenes, the dodecenes, the octadecenes, cyclopentene, cyclohexene, cycloheptene, cyclooctene, cyclododecene, lower alkyl substituted cyclopentene, lower alkyl substituted cyclohexene, lower alkyl substituted cycloheptene, butadiene, 1,3-pentadiene, isoprene, 1,3-hexadiene, 1,5-hexadiene, the heptadienes, 1,7-octadiene, the dodecadienes, 4-vinylcyclohexene, vinylcyclohexane, allylcyclohexane, vinylcyclopentane, styrene, 3-phenylpropene-1, 4-phenylbutene-1, bicyclo[4.3.0]nona-3,7-diene, the methyl substituted styrenes, the ethyl substituted styrenes, and the like. Preferred olefinic compounds include the alkenes especially those which have from 2 to 8 carbon atoms; the alkadienes especially those which have from 4 to 8 carbon atoms; the cycloalkenes especially those which have from 5 to 6 carbon atoms in the cycloalkenyl nucleus; the vinylcycloalkanes especially those which have from 5 to 6 carbon atoms in the cycloalkyl nucleus; the α-alkenylbenzenes especially those which have from 2 to 4 carbon atoms in the α-alkenyl moiety thereof; and the like. Highly preferred olefinic compounds include ethylene, propylene, 1-butene, 2-butene, butadiene, isoprene, cyclohexene, 4-vinylcyclohexene, and styrene. Ethylene is most preferred.

It is pointed out at this time that the term "lower alkyl," as used herein including the appended claims, is meant a monovalent saturated aliphatic hydrocarbon radical, which contains from 1 to 4 carbon atoms, e.g., methyl, ethyl, isopropyl, sec-butyl, and the like.

The novel process can be conducted over a wide temperature range and pressure range. The selection of the operative pressure and operative temperature for optimum results will depend upon various factors such as the nature of the olefinic reactant, the concentration of the reactants, the use of an inert, normally-liquid organic vehicle, the equipment employed, and the like. In general, the alkenylation reaction proceeds favorably at an elevated temperature. A reaction temperature in the range of from about 25° C., and lower, to about 175° C., and higher, is suitable whereas from about 60° C. to about 150° C. is preferred. It has been observed that eminent results are obtained by conducting the reaction at a temperature in the range of from about 75° C. to about 130° C. The operative pressure, also, can be varied over a wide range, e.g., from slightly below atmospheric pressure to super-atmospheric pressures. In general, it is desirable to employ a total pressure which is at least equal to one atmosphere. It is preferred, however, that the total pressure be slightly greater than one atmosphere and as high as 300 atmospheres, and higher. A total pressure up to about 100 atmospheres is highly preferred.

The alkenylation reaction can be effected for a period of time which is sufficient to produce the alkenyl acetate product. This period of time can vary from less than one second to several hours depending upon variables such as the nature of the olefinic reactants, the concentration of the reactants, the use of an inert normally-liquid organic vehicle, the reactor design, the operative temperature and pressure, and the like. For example, when conducting the alkenylation reaction in a tubular reactor in a continuous fashion, the residence period can vary from less than one second to about several minutes whereas a semi-continuous or batch-wise reaction may require a considerably longer residence period.

The alkenylation reaction is conducted as an essentially homogeneous liquid phase reaction and to this extent sufficient pressure is employed to maintain a homogeneous liquid phase. It is highly desirable to effect the alkenylation reaction in the essential absence of impurities which tend to inactivate the catalyst. It, also, is highly preferred to employ an essentially anhydrous feed mixture. The alkenylation reaction, initially, should be conducted in an essentially anhydrous medium. For instance, outstanding conversions and yields are obtained when the alkenylation reaction is effected in the presence of less than about one weight percent water.

The catalyst, Pd(II), is employed in catalytically significant quantities. A suitable concentration is from about $1 \times 10^{-7}$ to about 0.2 gram atom of Pd(II) per liter of liquid reaction medium (as described previously), and preferably from about $1 \times 10^{-5}$ to about 0.1 gram atom of Pd(II) per liter. Moreover, a catalyst concentration range that provides a ratio of from about $1 \times 10^{-6}$, and lower, to about 0.2, and higher, gram atom of Pd(II) per gram atom of Cu(II) (contained in cupric acetate), both being based on the metal, is desirable. It is preferred that the ratio be from about $1 \times 10^{-5}$ to about 0.1 gram atom of Pd(II) per gram atom of Cu(II). The source of the active catalyst species, Pd(II), can be derived from a palladium compound which is soluble in the reaction medium (acetic acid, catalytic co-oxidant, etc.) or which can become soluble therein by reaction with one of the components of said medium. Moreover, the palladium must be substantially present in said medium in its Pd(II) oxidation state and be capable of forming a complex with the olefinic reactant. The anion moiety of the palladium compounds is not critical especially since relatively small amounts of Pd(II) are contemplated. Illustrative palladium compounds include palladous acetate; Pd(II) acetylacetonate; Pd(II) dibenzonitrile dichloride; palladous dichloride; palladium metal (which oxidizes in the reaction medium to Pd(II)); the Pd(IV) compounds which are reduced in the reaction medium; the palladium-olefinic complexes, the olefinic moiety of which preferably corresponds to the olefinic reactant; and the like.

Preferably, the alkenylation reaction is effected in the presence of sufficient oxygen to essentially prevent the deposition of metal which results from the reduction of the catalytic cation, for example, to essentially prevent the deposition of Pd(O) resulting from the reduction of Pd(II), and further to essentially prevent the deposition of metal resulting from the reduction of the catalytic co-oxidant. Expressed in another way, the alkenylation reaction preferably is conducted in the presence of oxygen which is at least sufficient to maintain the ratio of the catalytic co-oxidant in its higher oxidation state to the catalytic co-oxidant in its lower oxidation state, i.e., Cu(II)/Cu(I), at a level such that the Cu(II)/Cu(I) couple is capable of converting Pd(O) to Pd(II) at a rate which maintains a catalytically significant concentration of Pd(II) and which essentially prevents deposition of Pd(O). This factor, i.e., whether or not the alkenylation reaction is being effected in the presence of sufficient oxygen, is readily ascertained by an operator who can routinely and periodically withdraw samples of the reaction product mixture and analyze same for Pd(O) and/or Cu(II). As a practical matter, the concentration of oxygen is a function of the operative pressure, operative temperature, and the like. In addition, factors such as residence time, the equipment used, safety factors to be observed, and the like, can impose practical considerations. By way of an illustration, should ethylene be the olefinic reagent, caution should be exercised, for example, in the recovery of the unreacted ethylene so as not to build up to a potentially explosive mixture by virtue of the concentration of oxygen therein. Moreover, to avoid additional separation and recovery procedures, it is highly desirable to introduce an oxygen-rich gas to the system. For obvious economic and commercial reasons, a substantially pure oxygen feed, e.g., a gas containing at least 90 volume percent oxygen, is preferred. The introduction of essentially pure oxygen into the system is highly preferred. The introduction of oxygen or oxygen contained in an otherwise inert gaseous medium is preferably effected in such a manner to insure intimate contact with the liquid phase. Other means of oxidizing the reduced catalytic co-oxidant, Cu(I), to its higher oxidation state, Cu(II), may be employed, for example, oxides of nitrogen, e.g., $N_2O_4$; peroxides which contain the —O—O— bond, e.g., peracetic acid; and the like.

As indicated previously, the concentration of cupric acetate as defined by Expression I supra is at least about 10 percent, and preferably at least about 25 percent, greater than the maximum concentration as defined by Expression II supra. Cupric acetate per se or a copper compound which will generate cupric acetate in the reaction medium can be employed in the novel process. For instance, copper compounds, e.g., copper oxide, etc., which dissolve in acetic acid, or various cuprous compounds or metallic copper which can be oxidized in situ in the reaction mixture, can be used as the source of the catalytic co-oxidant, i.e., cupric acetate.

The concentration of the olefinic compound will depend, to a significant degree, upon several variables. For the homogeneous liquid phase reaction, the solubility of the olefinic compounds which are gaseous under the operative conditions of the alkenylation reaction is proportional to the pressure, or expressed differently, the partial pressure of the gaseous olefinic compound above the liquid reaction mixture will directly affect the alkenylation reaction rate. Olefinic compounds which are liquid at the reaction temperature, at atmospheric pressure, are readily soluble in the liquid reaction mixture, and thus, the concentration of same can be varied over a wide range essentially independent of the operating pressure, as desired. In general, a concentration of olefinic compound which is at least sufficient to maintain substantially all of the Pd(II) in the form of Pd(II)-olefin complex is desirable, though lesser amounts of olefinic compound can be employed with the possible disadvantage of a lower alkenylation reaction rate. The practical upper limit of the concentration of olefinic compound is that concentration which measurably decreases the solubility of inorganic components, e.g., catalytic co-oxidant, of the reaction mixture.

The metal acetate, i.e., potassium acetate, lithium acetate, or mixtures thereof, can be added directly to the reaction medium, or it can be generated in situ by the reaction of a basic compound with the acetic acid component, providing that the neutralization product (from the reaction of said basic compound and said acid) does not interfere with the alkenylation reaction, or if said neutralization product does interfere it is capable of being readily removed from the reaction medium. The basic salts of a strong base and a weak acid, the cation portion of said salts being capable of forming a soluble acetate salt in the acetic acid, are preferred for providing the metal acetate. Illustrative basic salts include lithium hydroxide, potassium hydroxide, potassium oxide, lithium oxide, potassium carbonate, lithium carbonate, potassium propionate, and the like. Also, the additional source of the acetate anion can be furnished by palladous acetate.

The novel process can be executed in a batch, semicontinuous, or continuous fashion. The equipment can be fabricated of glass, metal, alloy, etc., to best suit the particular and individual needs of the design and contemplated operative conditions. One suitable manner for effecting the alkenylation reaction is to first prepare a homogenous liquid medium comprising cupric acetate, metal acetate (MOAc), palladous acetate, and acetic acid. Under the desired operative conditions of temperature and pressure, the olefinic compound, e.g., ethylene, and oxygen, can be introduced either together, simultaneously, or separately into the homogeneous liquid phase reaction mixture. The olefinic ester product and water can be continuously removed from the reaction zone, followed by recovering the desired product therefrom via conventional procedures well known to the art. It is important to essentially avoid the build-up of water in the reaction zone since significant amounts of same can result in drastically lower yields of the olefinic ester product.

In one embodiment, the novel process is effected in an essentially halide free system, especially a chloride free system, for instance, in a system containing less than a few parts per million (p.p.m.) of halide, and preferably less than 5 to 10 p.p.m. of halide. By operating the novel process in accordance with this embodiment, several pronounced advantages are obtained. From commercial standpoints, the novel process can be conducted with equipment constructed of, for example, stainless steel which otherwise would be readily attacked by relatively small amounts of halide. On the other hand, in order for a system to tolerate even a small amount of halide, one must resort to equipment fabricated from prohibitively expensive metals such as Hastelloy or titanium. A further advantage which accrues is the relative increased solubility and stability of the catalytic co-oxidant in its lower oxidation state, i.e., cuprous acetate, as compared with, for example, cuprous chloride. The low solubility of cuprous chloride and its tendency to disproportionate to Cu(O) and Cu(II) limit the degree to which Cu(II) can be converted to Cu(I) in a chloride containing system. This limits the productivity of a halide containing catalyst solution. Moreover, the obvious commercial disadvantages which result because of the formation of halogenated organic by-products are eliminated in this embodiment.

Cuprous acetate in the halide free catalyst solution previously described is both freely soluble and stable toward disproportionation and therefore permits efficient use of the oxidizing power of the catalyst solution.

In another embodiment, the novel process can be effected in two steps, namely (1) the alkenylation reaction, and (2) the regeneration reaction, both reactions preferably being effected in a halide free system. In the alkenylation reaction step, the olefinic compound is contacted with acetic acid, metal acetate (MOAc), the catalyst, Pd(II), and the catalytic co-oxidant, cupric acetate, under the operative conditions noted previously, to produce the olefinic ester of acetic acid as the product. The alkenylation reaction is initially commenced under essentially anhydrous conditions. The product, namely the olefinic ester of acetic acid, and also, unreacted olefinic compound, if desired, are recovered from the reaction product mixture (which results from the alkenylation reaction) via conventional techniques, e.g., distillation under reduced pressure. The remainder of residue therefrom which contains some catalytic co-oxidant in the lower oxidation state, Cu(I), acetic acid, metal acetate, and perhaps some Pd(O), is contacted with sufficient oxygen to regenerate said catalytic co-oxidant from a lower state of oxidation, Cu(I), to a higher state of oxidation, Cu(II). In addition, Pd(O), likewise is oxidized to Pd(II). The water produced during this regeneration step is subsequently removed, e.g., by distillation. This regenerated mixture comprising acetic acid, metal acetate, Cu(II), and Pd(II) then is recycled to the alkenylation step with additional acetic acid being added thereto. An inert normally-liquid organic vehicle such as those exemplified previously can be employed during the alkenylation step and/or the regeneration step, as desired. However, the advantages discussed supra which result from using a halide free system is obtained, also, in this two step embodiment.

In extremely preferred aspects, the invention is directed to a novel, essentially anhydrous, liquid composition which contains cupric acetate; a metal acetate of the group consisting of lithium acetate, potassium acetate, and mixtures thereof; acetic acid; and palladium(II); the concentration of cupric acetate as defined by Expression I I $$\frac{[Cu(OAc)_2]}{[Cu(OAc_2)]+[MOAc]+[Z]}$$

being at least about 10 percent greater, and preferably at least about 25 percent greater than the maximum concentration of cupric acetate as defined by Expression II II $$\frac{[Cu(OAc)_2]}{[Cu(OAc)_2+[Z]}$$

wherein Expressions I and II supra represent homogeneous liquid systems at the same temperature, wherein

represents cupric acetate, wherein MOAc represents lithium acetate, potassium acetate, or mixtures thereof, and wherein Z represents acetic acid or a mixture of acetic acid and an inert, normally-liquid organic vehicle. In a particular desirable aspect, the invention is directed to a novel, essentially anhydrous, liquid composition comprising (a) cupric acetate, (b) a metal acetate of the group consisting of lithium acetate, potassium acetate, and mixtures thereof, (c) a compound of the group consisting of acetic acid and a mixture of acetic acid plus an inert, normally-liquid organic vehicle, and (d) palladium(II); in such relative amounts so as to provide a ratio of from about 1 to about 10 mols of said metal acetate and up to about 90 mols (preferably from about 1 to about 90 mols), of said compound (c) above, per mol of cupric acetate; and from about $1 \times 10^{-7}$ to about 0.2 gram atom (preferably from about $1 \times 10^{-5}$ to about 0.1 gram atom) of palladium(II) per gram atom of copper(II) contained in the cupric acetate.

In a highly advantageous aspect, the invention is directed to a novel, essentially anhydrous, liquid composition comprising (a) cupric acetate, (b) a metal acetate of the group consisting of lithium acetate, potassium acetate, mixtures thereof, (c) a compound of the group consisting of acetic acid and a mixture of acetic acid plus an inert, normally-liquid organic vehicle, and (d) palladium(II); in such relative amounts so as to provide a ratio of from about 2 to about 8 mols of said metal acetate and from about 10 to about 20 mols of said compound (c) above, per mol of cupric acetate; and from about $1 \times 10^{-5}$ to about 0.1 gram atom of palladium(II) per gram atom of copper(II) contained in the cupric acetate. The outstanding novel compositions are those which are essentially free of halide. In addition, an inert, normally-liquid organic vehicle can be employed in the aforesaid novel compositions. These novel compositions taken singly, or collectively, when employed in the novel processes discussed supra, give several or all of the advantages discussed throughout the specification.

Other metal species, in addition to Pd(II), are capable of catalyzing the alkenylation reaction. Such metals should possess an oxidation state in which the metal can form a coordination complex with olefins, and a second lower oxidation state which can be formed from the complex-forming state by the gain of two electrons. Suitable metals are, for example, platinum, rhodium, iridium, ruthenium, osmium, and gold.

The solubility data described in Examples 1–5 infra were determined by alternately adding to 50 grams of redistilled glacial acetic acid in a three-neck round bottom flask equipped with an oil bath, magnetic stirrer, thermometer, condenser, and drying tube, incremental portions of copper acetate and metal acetate, i.e., lithium acetate, potassium acetate, or mixtures thereof. A slight excess of cupric acetate would give a heterogeneous mixture, a slight excess of metal acetate would give a homogeneous solution. When a homogeneous solution was obtained, an increment of cupric acetate was added, and when the system was heterogeneous, then metal acetate was added. The temperature was kept within ±2° C. After allowing 5–15 minutes for the cupric acetate to dissolve, the incremental composition was noted as being homogeneous or heterogeneous, and an appropriate point was placed on a graph. Eventually the mixture reached a point where no more cupric acetate would dissolve on addition of metal acetate.

The Pd(II) catalyst and olefin reactant may be added to the homogeneous solutions containing the increased concentrations of Cu(II) acetate, as described above, in amounts to induce production of the olefinic ester of acetic acid. The Pd(II) catalyst and olefin reactant may be provided in the solutions in amounts preferred for the production of the olefinic ester without lowering the Cu(II) acetate and potassium acetate and/or lithium acetate concentrations in the solution below that which represents the enhanced concentrations of Cu(II) as embodied within this invention.

The following represents specific illustrations of the instant invention and are not to be construed as limitations on the foregoing.

EXAMPLE 1

Following the procedure described above, the maximum solubility of cupric acetate in acetic acid (50 grams)—potassium acetate homogeneous liquid systems at 100° C. is shown in the solubility curve depicted in FIGURE 1. The maximum solubility of cupric acetate in acetic acid per se (50 grams) is likewise shown as a reference point. The pertinent data are set forth in Table I below which also includes the maximum productivity of vinyl acetate product obtainable for each homogeneous system under consideration.

Table I

| Mol of $Cu(OAc)_2$ | Mol of KOAc [1] | Vinyl Acetate Productivity [2] |
|---|---|---|
| 0.00818 | 0.0 | $8.02 \times 10^{-3}$ |
| 0.01105 | 0.0439 | $9.77 \times 10^{-3}$ |
| 0.0221 | 0.0969 | $17.3 \times 10^{-3}$ |
| 0.0331 | 0.1377 | $23.8 \times 10^{-3}$ |
| 0.0442 | 0.1775 | $29.3 \times 10^{-3}$ |
| 0.0552 | 0.2265 | $33.6 \times 10^{-3}$ |

[1] Minimum number of mols of potassium acetate necessary to obtain a homogeneous solution.
[2] Maximum number of mols of vinyl acetate obtainable per 100 grams of reaction mixture, at 100° C., using ethylene as a reactant, and Pd(II) as catalyst therefor.

EXAMPLE 2

Figure 2:
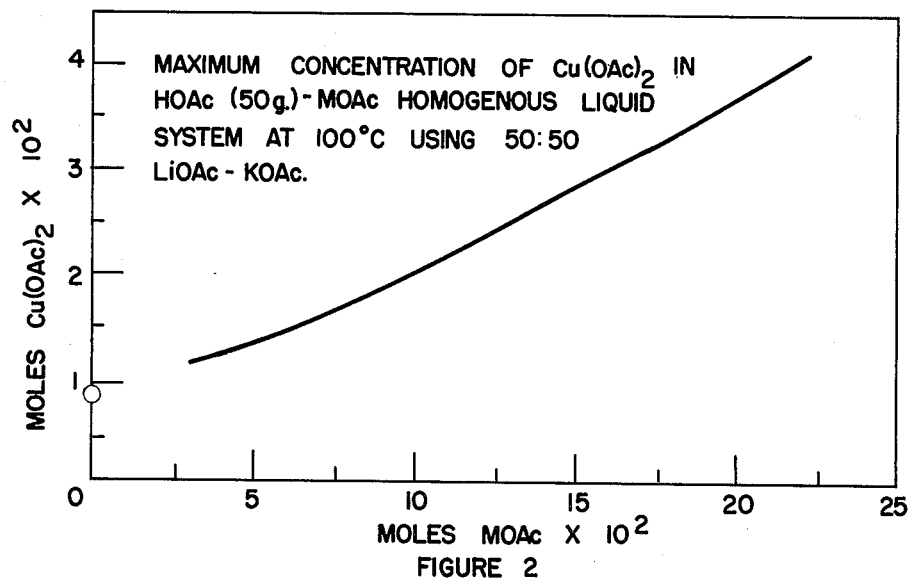
FIGURE 2 represents a solubility curve which discloses the maximum concentration of cupric acetate in acetic acid-lithium acetate-potassium acetate homogeneous liquid systems at 100° C.

Following the procedure described above, the maximum solubility of cupric acetate in acetic acid (50 grams) and an equimolar mixture of potassium acetate and lithium acetate homogeneous liquid systems at 100° C. is shown in the solubility curve depicted in FIGURE 2. The maximum solubility of cupric acetate in acetic acid per se (50 grams) is likewise shown as a reference point. The pertinent data are set forth in Table II below which also includes the maximum productivity of vinyl acetate product obtainable for each homogeneous system under consideration.

Table II

| Mol of $Cu(OAc)_2$ | Mol of KOAc/LiOAc [1] | Vinyl Acetate Productivity [2] |
|---|---|---|
| 0.00818 | 0.0 | $8.02 \times 10^{-3}$ |
| 0.01657 | 0.0756 | $13.9 \times 10^{-3}$ |
| 0.0221 | 0.113 | $17.5 \times 10^{-3}$ |
| 0.0331 | 0.183 | $23.4 \times 10^{-3}$ |
| 0.0442 | 0.2305 | $28.7 \times 10^{-3}$ |

[1] Minimum number of mols of an equimolar mixture of potassium acetate and lithium acetate necessary to obtain a homogeneous solution.
[2] Maximum number of mols of vinyl acetate obtainable per 100 grams of reaction mixture, at 100° C., using ethylene as a reactant, and Pd(II) as catalyst therefor.

EXAMPLE 3

Figure 3:
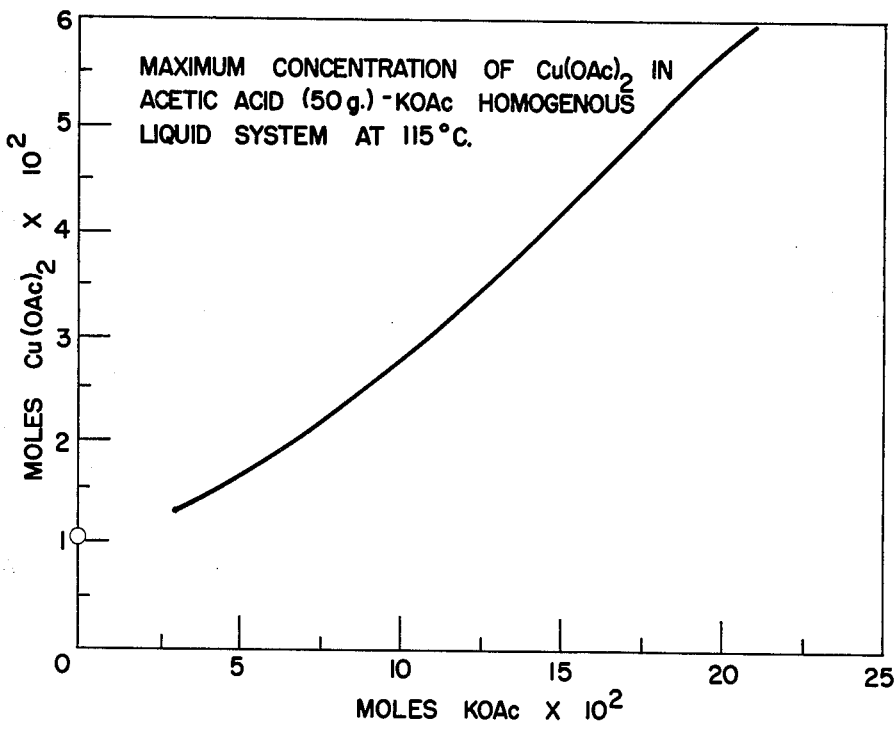
FIGURE 3 represents a solubility curve which discloses the maximum concentration of cupric acetate in acetic acid-potassium acetate homogeneous liquid systems at 115° C.

Following the procedure described above, the maximum solubility of cupric acetate in acetic acid (50 grams)—potassium acetate homogeneous liquid systems at 115° C. is shown in the solubility curve depicted in FIGURE 3. The maximum solubility of cupric acetate in acetic acid per se (50 grams) is likewise shown as a reference point. The pertinent data are set forth in Table III below which also includes the maximum productivity of vinyl acetate product obtainable for each homogeneous system under consideration.

Table III

| Mol of $Cu(OAc)_2$ | Mol of KOAc [1] | Vinyl Acetate Productivity [2] |
|---|---|---|
| 0.01132 | 0.0 | $10.9 \times 10^{-3}$ |
| 0.01657 | 0.0561 | $14.2 \times 10^{-3}$ |
| 0.0221 | 0.0888 | $17.7 \times 10^{-3}$ |
| 0.0331 | 0.1275 | $24.2 \times 10^{-3}$ |
| 0.0442 | 0.1653 | $26.1 \times 10^{-3}$ |
| 0.0552 | 0.2102 | $30.1 \times 10^{-3}$ |
| 0.0608 | 0.2450 | $31.2 \times 10^{-3}$ |

[1] Minimum number of mols of potassium acetate necessary to obtain a homogeneous solution.
[2] Maximum number of mols of vinyl acetate obtainable per 100 grams of reaction mixture, at 115° C., using ethylene as a reactant, and Pd(II) as catalyst therefor.

EXAMPLE 4

Figure 4:
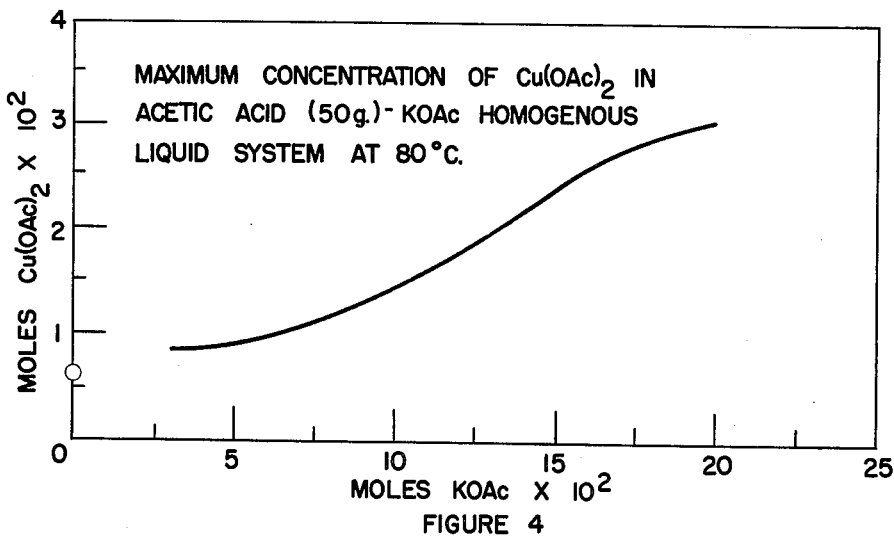
FIGURE 4 represents a solubility curve which discloses the maximum concentration of cupric acetate in acetic acid-potassium acetate homogeneous liquid systems at 80° C.

Following the procedure described above, the maximum solubility of cupric acetate in acetic acid (50 grams)—potassium acetate homogeneous liquid systems at 80° C. is shown in the solubility curve depicted in FIGURE 4. The maximum solubility of cupric acetate in acetic acid per se (50 grams) is likewise shown as a reference point. The pertinent data are set forth in Table IV below which also includes the maximum productivity of vinyl acetate product obtainable for each homogeneous system under consideration.

Table IV

| Mol of $Cu(OAc)_2$ | Mol of KOAc [1] | Vinyl Acetate Productivity [2] |
|---|---|---|
| 0.00624 | 0.0 | $6.28 \times 10^{-3}$ |
| 0.01132 | 0.0612 | $9.68 \times 10^{-3}$ |
| 0.01657 | 0.1062 | $13.0 \times 10^{-3}$ |
| 0.0276 | 0.1685 | $19.3 \times 10^{-3}$ |
| 0.0387 | 0.2162 | $24.7 \times 10^{-3}$ |

[1] Minimum number of mols of potassium acetate necessary to obtain a homogeneous solution.
[2] Maximum number of mols of vinyl acetate obtainable per 100 grams of reaction mixture at 80° C., using ethylene as a reactant, and Pd(II) as catalyst therefor.

EXAMPLE 5

Figure 5:
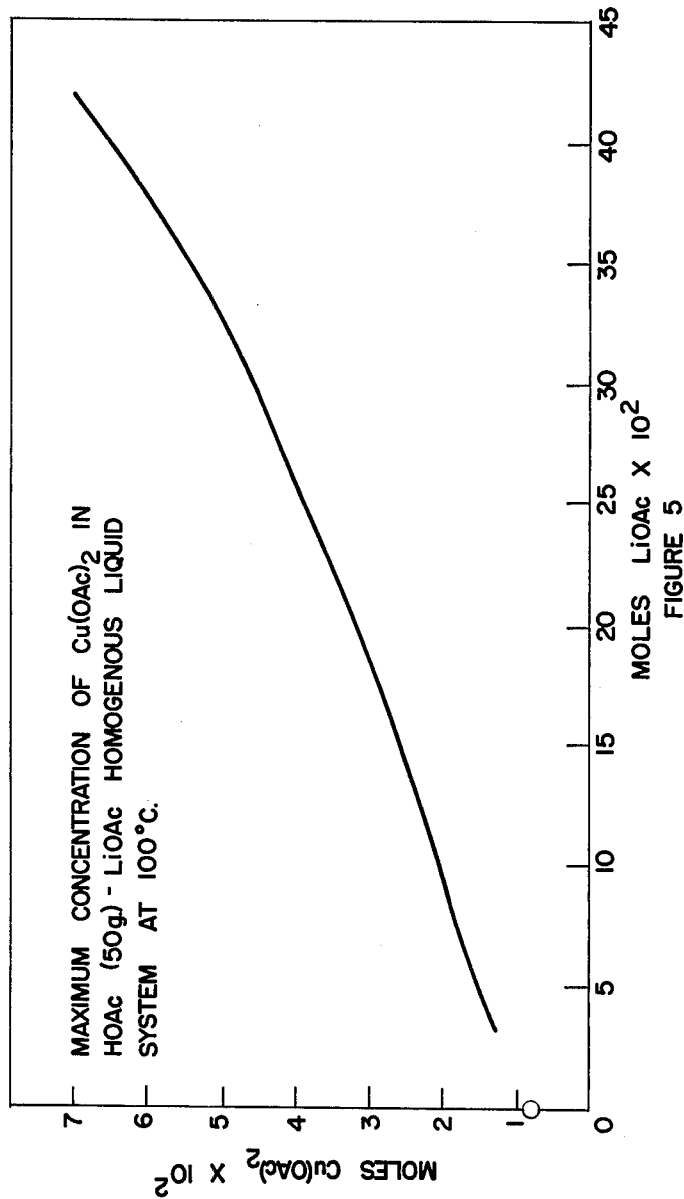
FIGURE 5 represents a solubility curve which discloses the maximum concentration of cupric acetate in acetic acid-lithium acetate homogeneous liquid systems at 100° C.

Following the procedure described above, the maximum solubility of cupric acetate in acetic acid (50 grams)—lithium acetate homogeneous liquid systems at 100° C. is shown in the solubility curve depicted in FIGURE 5. The maximum solubility of cupric acetate in acetic acid per se (50 grams) is likewise shown as a reference point. The pertinent data set forth in Table V below which also includes the maximum productivity of vinyl acetate product obtainable for each homogeneous system under consideration.

Table V

| Mol of Cu(OAc)$_2$ | Mol of LiOAc [1] | Vinyl Acetate Productivity [2] |
| --- | --- | --- |
| 0.00818 | 0.0 | 8.02×10$^{-3}$ |
| 0.01657 | 0.0727 | 14.3×10$^{-3}$ |
| 0.0221 | 0.1136 | 18.0×10$^{-3}$ |
| 0.0331 | 0.191 | 24.2×10$^{-3}$ |
| 0.0442 | 0.282 | 28.8×10$^{-3}$ |
| 0.0552 | 0.359 | 33.0×10$^{-3}$ |

[1] Minimum number of mols of lithium acetate necessary to obtain a homogeneous solution.
[2] Maximum number of mols of vinyl acetate obtainable per 100 grams of reaction mixture, at 100° C., using ethylene as a reactant, and Pd(II) as catalyst therefor.

EXAMPLE 6

To a 250 milliliter Erlenmeyer flask there were charged 100 grams of redistilled glacial acetic acid, 10 grams of anhydrous cupric acetate, and 48 grams of anhydrous potassium acetate. The resulting mixture was heated to 100° C. at which temperature it was homogeneous, followed by filtering said mixture through a hot sintered glass funnel. Some crystallization occurred in the filtrate during the filtration procedure, so an additional 10 grams of acetic acid was added to the filtrate. Thus, the resulting filtrate was maintained as a solution and kept at a temperature of about 100° C.

A second solution was prepared by dissolving 10 grams of anhydrous sodium acetate in 40 grams of glacial acetic acid at 100° C. This solution was filtered through a hot sintered glass funnel and any precipitation in the filtrate was redissolved by maintaining said filtrate at 100° C. This homogeneous solution was added to the first homogeneous solution above which contained cupric acetate therein, and after about 15 to 30 seconds, precipitation of a complex salt was noted. This admixture was kept at 100° C. for 10 minutes, then filtered through a hot sintered glass funnel. The precipitate was collected and dried under vacuum for 24 hours, then ground for analysis:

Found:
  Copper _____ 21.42
  Sodium _____ 3.77
  Potassium _____ 4.15
  Carbon _____ 29.01
  Hydrogen _____ 3.89
Calculated (6Cu(OAc)$_2$·3NaOAc·2KOAc·6HOAc):
  Copper _____ 20.2
  Sodium _____ 3.65
  Potassium _____ 4.13
  Carbon _____ 29.26
  Hydrogen _____ 4.00

EXAMPLE 7

*Part A.*—To a 3-liter cylindrical glass bomb liner equipped with a 55/50 standard taper cap, a thermocouple well, and a gas inlet aperture, there were charged 42.8 grams of anhydrous cupric acetate, 60.4 grams of anhydrous potassium acetate, 40.7 grams of anhydrous lithium acetate, 1.13 grams of palladium diacetate, and 252 grams of glacial acetic acid. The glass bomb liner and its contents were inserted into a high pressure cylindrical steel bomb equipped with gas inlet and outlet conduits and a thermocouple port. The bomb and glass liner were then purged with nitrogen and heated with rocking to 100° C. under a nitrogen atmosphere. Ethylene was charged into the bomb to 500 pounds per square inch gauge, and heating and rocking of the bomb was continued for 0.5 hour. The bomb was then cooled below 35° C. and excess ethylene was vented to atmospheric pressure. The bomb liner was removed, and the resulting reaction product mixture was found to contain 11 grams, an essentially theoretical yield of vinyl acetate, as determined by vapor phase chromatography with reliable calibration.

This yield is 4.06 times the maximum yield of vinyl acetate which could have been obtained through use of an amount of copper(II) acetate equal to the normal maximum solubility of this salt in the quantity of acetic acid used, the amount of palladium(II) catalyst being the same in both cases.

*Part B.*—In an analogous manner as above, when propylene is used in lieu of ethylene as the reactant, there is obtained a high yield of propenyl acetate.

EXAMPLE 8

*Part A.*—To a 3-liter cylindrical glass bomb liner equipped with a 55/50 standard taper cap, a thermocouple well, and a gas inlet aperture, there were charged 50 grams of anhydrous cupric acetate, 120 grams of anhydrous lithium acetate, 1.13 grams of palladium diacetate, and 250 grams of glacial acetic acid. The glass liner and its contents were inserted into a high pressure cylindrical steel bomb equipped with gas inlet and outlet conduits and a thermocouple port. The bomb and glass liner were then purged with nitrogen and heated with rocking to 101° C. under a nitrogen atmosphere. Ethylene was charged into the bomb to 500 pounds per square inch gauge, and heating and rocking of the bomb was continued for 0.25 hour. The bomb was then cooled below 35° C. and excess ethylene was vented to atmospheric pressure. The bomb liner was removed, and the resulting reaction product mixture was found to contain 12 grams, an essentially quantitative yield, of vinyl acetate as determined by vapor phase chromatography with reliable calibration.

This yield is 4.51 times the maximum yield of vinyl acetate which could have been obtained through use of an amount of copper(II) acetate equal to the normal maximum solubility of this salt in the quantity of acetic acid used, the amount of palladium(II) catalyst being the same in both cases.

*Part B.*—In an analogous manner as above, when cyclohexene is used in lieu of ethylene as the reactant, there is obtained a high yield of cyclohexenyl acetate.

EXAMPLE 9

*Part A.*—To a 3-liter cylindrical glass bomb liner equipped with a 55/50 standard taper cap, a thermocouple well, and a gas inlet aperture, there were charged 55 grams of anhydrous cupric acetate, 125 grams of anhydrous potassium acetate, 1.13 grams of palladium diacetate, and 250 grams of glacial acetic acid. The glass bomb liner and its contents were inserted into a high pressure cylindrical steel bomb equipped with gas inlet and outlet conduits and a thermocouple port. The bomb and glass liner were then purged with nitrogen and heated with rocking to 117° C. under a nitrogen atmosphere. Ethylene was charged into the bomb to 500 pounds per square inch gauge, and heating and rocking of the bomb was continued for 0.5 hour. The bomb was then cooled below 35° C. and excess ethylene was vented to atmospheric pressure. The bomb liner was removed, and the resulting reaction product mixture was found to contain 8.7 grams, 64% of the theoretical yield, of vinyl acetate as determined by vapor phase chromatography with reliable calibration.

This yield is 2.63 times the maximum yield of vinyl acetate which could have been obtained through use of an amount of copper(II) acetate equal to the normal maximum solubility of this salt in the quantity of acetic acid used, the amount of palladium(II) catalyst being the same in both bases.

*Part B.*—In an analogous manner as above, when butene is used in lieu of ethylene as the reactant, there is obtained a high yield of butenyl acetate.

EXAMPLE 10

To a 3-liter cylindrical glass bomb liner equipped with a 55/50 standard taper cap, a thermocouple well, and a gas inlet aperture, there were charged 54.3 grams of anhydrous cupric acetate, 127.3 grams of anhydrous lithium acetate, 3.05 grams of palladium acetylacetonate, and 252 grams of glacial acetic acid. The glass bomb liner and its contents were inserted into a high pressure cylindrical steel bomb equipped with gas inlet and outlet conduits and a thermocouple port. The bomb and glass liner were then purged with nitrogen and heated with rocking to 100° C. under a nitrogen atmosphere. Ethylene was charged into the bomb to 500 pounds per square inch gauge, and heating and rocking of the bomb was continued for 1 hour. The bomb was then cooled below 35° C. and excess ethylene was vented to atmospheric pressure. The bomb liner was removed, and the resulting reaction product mixture was found to contain 4.5 grams, 32.6% of the theoretical yield, of vinyl acetate as determined by vapor phase chromatography with reliable calibration.

This yield is 1.70 times the maximum yield of vinyl acetate which could have been obtained through use of an amount of copper(II) acetate equal to the normal maximum solubility of this salt in the quantity of acetic acid used, the amount of palladium(II) catalyst being the same in both cases.

EXAMPLE 11

To a 3-liter cylindrical glass bomb liner equipped with a 55/50 standard taper cap, a thermocouple well, and a gas inlet aperture, there were charged 54.3 grams of anhydrous cupric acetate, 117.7 grams of anhydrous potassium acetate, 3.05 grams of palladium acetylacetonate, and 252 grams of glacial acetic acid. The glass bomb liner and its contents were inserted into a high pressure cylindrical steel bomb equipped with gas inlet and outlet conduits and a thermocouple port. The bomb and glass liner were then purged with nitrogen and heated with rocking to 101° C. under a nitrogen atmosphere. Ethylene was charged into the bomb to 200 pounds per square inch gauge, and heating and rocking of the bomb was continued for 2 hours. The bomb was then cooled below 35° C. and excess ethylene was vented to atmospheric pressure. The bomb liner was removed, and the resulting reaction product mixture was found to contain 8.2 grams, 60% of the theoretical yield, of vinyl acetate as determined by vapor phase chromatography with reliable calibration.

This yield is 3.13 times the maximum yield of vinyl acetate which could have been obtained through use of an amount of copper(II) acetate equal to the normal maximum solubility of this salt in the quantity of acetic acid used, the amount of palladium(II) catalyst being the same in both cases.

Though the above describes this invention with reliance on specific details, such are not to be construed as limitations on this invention unless they are recited in the claims.

What is claimed is:

1. A process for the production of olefin esters of acetic acid which comprises providing in a reaction zone an essentially halide free homogeneous solution of an olefin free of acetylenic unsaturation, a palladium(II) compound, a salt from the class consisting of potassium acetate, lithium acetate and mixtures thereof, an acetate of copper at least a portion of which is cupric acetate, and acetic acid, said alkali metal salt and acetate of copper being present in a sufficient amount so that the concentration of said acetate of copper, calculated as cupric acetate, is at least 10 percent greater than is the maximum solubility of cupric acetate in said solution free of said alkali metal salt.

2. The process of claim 1 wherein the olefin is ethylene.

3. The process of claim 1 wherein oxygen is provided in said homogeneous solution.

4. The process of claim 1 wherein oxygen is provided in said homogeneous solution after removal of at least a part of the olefin ester of acetic acid produced in said reaction zone and said mixture is recycled to said reaction zone.

5. The process of claim 1 wherein the temperature in the reaction zone is from about 60° C. to about 150° C.

6. The process of claim 1 wherein the olefin is ethylene, the concentration of cupric acetate is at least 10 percent greater than its maximum solubility in the homogeneous solution free of the salt, and after removal of vinyl acetate and water formed in the reaction zone from the homogeneous solution, oxygen is provided in said solution to regenerate reduced copper acetate and the regenerated solution is recycled to the reaction zone.

References Cited by the Examiner

FOREIGN PATENTS

| | | |
|---|---|---|
| 137,511 | 4/1960 | U.S.S.R. |
| 608,610 | 3/1962 | Belgium. |
| 614,970 | 9/1962 | Belgium. |

OTHER REFERENCES

Moiseev Doklady Akademii Naul U.S.S.R., vol. 133, pp. 377–380 (1960).

Smidt Chemistry & Industry, Jan. 13, 1962, pp. 54–61.

Smidt Angew. Chim., vol. 71, pp. 176–182 (1959).

LORRAINE A. WEINBERGER, *Primary Examiner.*

LEON ZITVER, *Examiner.*

D. P. CLARKE, B. M. EISEN, *Assistant Examiners.*